US012700998B1

(12) United States Patent     (10) Patent No.:   US 12,700,998 B1

Sehrawat     (45) Date of Patent:     Aug. 4, 2026

(54) POST-QUANTUM VERIFIABLE JOINT-WATERMARKING FOR MULTIPARTY ARTIFICIAL INTELLIGENCE MODELS

(71) Applicant: Circle Internet Group, Inc., New York, NY (US)

(72) Inventor: Vipin Singh Sehrawat, Fremont, CA (US)

(73) Assignee: Circle Internet Group, Inc., New York, NY (US)

( * ) Notice: Subject to any disclaimer, the term of this patent is extended or adjusted under 35 U.S.C. 154(b) by 0 days.

(21) Appl. No.: 19/388,135

(22) Filed: Nov. 13, 2025

Related U.S. Application Data

(63) Continuation of application No. 19/360,921, filed on Oct. 16, 2025.

(51) Int. Cl.
     *H04L 9/08*       (2006.01)
     *G06F 21/16*      (2013.01)
     *G06N 3/0475*    (2023.01)

(52) U.S. Cl.
     CPC ............ *H04L 9/0869* (2013.01); *G06F 21/16* (2013.01); *G06N 3/0475* (2023.01); *H04L 9/083* (2013.01)

(58) Field of Classification Search
     CPC ..... H04L 9/0869; H04L 9/083; H04L 9/3247; H04L 9/14; G06N 3/0475; G06F 21/16
     See application file for complete search history.

(56) References Cited

U.S. PATENT DOCUMENTS

| | | | | |
|---|---|---|---|---|
| 11,436,305 | B2 * | 9/2022 | Liu ......................... | G06F 21/57 |
| 11,574,032 | B2 * | 2/2023 | Cheng .................... | G06N 3/082 |
| 11,582,260 | B2 * | 2/2023 | Cheng ................... | H04L 9/0643 |
| 11,704,390 | B2 * | 7/2023 | Liu ....................... | H04L 9/0897 |
| | | | | 713/176 |
| 12,124,592 | B1 * | 10/2024 | O'Hern ................. | G06N 20/00 |
| 12,147,562 | B1 * | 11/2024 | El Kharzazi ........... | G06N 3/045 |
| 12,158,929 | B1 * | 12/2024 | Huang .................. | H04L 9/0643 |
| 12,265,964 | B2 * | 4/2025 | Dash .................. | G06Q 20/3827 |
| 12,322,402 | B2 * | 6/2025 | Drolet .................. | G10L 19/018 |
| 12,423,388 | B2 * | 9/2025 | Horton ................. | G06F 16/632 |

OTHER PUBLICATIONS

Atapoor et al., "Practical Robust DKG Protocols for CSIDH," ACNS 2023—21st International Conference on Applied Cryptography and Network Security, 2023, 34 pages.

(Continued)

*Primary Examiner* — Hosuk Song

(74) *Attorney, Agent, or Firm* — Fish & Richardson P.C.

(57)            ABSTRACT

Methods, systems, and computer-readable storage media for receiving a prompt, providing a context window as a hash value at least partially based on a set of previously received tokens, determining a split parameter using a first key of a first party and a second key of a second party, the first key and the second key generated by a distributed key generation (DKG) process using a channel key, providing a green list of tokens and a red list of tokens using the split parameter, determining a watermark probability distribution that favors tokens in the green list of tokens over tokens in the red list of tokens, and returning watermarked digital content that is generated using the watermark probability distribution.

10 Claims, 4 Drawing Sheets

(56)     References Cited

OTHER PUBLICATIONS

Boneh et al., "Key homomorphic PRFs and their applications," Crypto 2013, Feb. 2, 2014, pp. 1-41.

Kirchenbauer et al., "A Watermark for Large Language Models," CoRR, Submitted on May 1, 2024, arXiv:2301.10226v4, 26 pages.

Sehrawat et al., "Bi-Homomorphic Lattice-Based PRFs and Unidirectional Updatable Encryption," CoRR, Submitted on Aug. 20, 2020, arXiv:1908.09032v3, 23 pages.

* cited by examiner

POST-QUANTUM VERIFIABLE JOINT-WATERMARKING FOR MULTIPARTY ARTIFICIAL INTELLIGENCE MODELS

CROSS-REFERENCE TO RELATED APPLICATION

This application is a continuation application of and claims the benefit of priority to U.S. application Ser. No. 19/360,921, filed on Oct. 16, 2025, the contents of which is hereby incorporated by reference.

TECHNICAL FIELD

This specification relates generally to watermarking digital content and more particularly to watermarking digital content generated using generative artificial intelligence (GAI) using post-quantum, verifiable joint watermarks.

BACKGROUND

In the field of artificial intelligence (AI), so-called generative AI (GAI) has recently seen an explosion in popularity. GAI can be described as including foundation models that generate content based on training data. For example, foundation models can include LLMs, which are a form of GAI that can be used to generate text and perform other functions for a variety of use cases. In general, GAI can be used to generate any form of digital content, such as text, images, video, audio, documents, and the like.

SUMMARY

This specification describes systems, methods, devices, and other techniques relating to watermarking digital content. More particularly, implementations of the present disclosure are directed to watermarking digital content generated using generative artificial intelligence (GAI) using post-quantum, verifiable joint watermarks.

In general, innovative aspects of the subject matter described in this specification can include actions of receiving a first prompt, providing a first context window as a hash value at least partially based on a set of previously received tokens, determining a first split parameter using a first key of a first party and a second key of a second party, the first key and the second key generated by a distributed key generation (DKG) process using a channel key, providing a first green list of tokens and a first red list of tokens using the first split parameter, determining a first watermark probability distribution that favors tokens in the first green list of tokens over tokens in the first red list of tokens, and returning first watermarked digital content that is generated using the first watermark probability distribution. Other implementations of this aspect include corresponding systems, apparatus, and computer programs, configured to perform the actions of the methods, encoded on computer storage devices.

These and other implementations can each optionally include one or more of the following features: actions further include executing a process to establish remote ownership of a trusted execution environment (TEE) by the second party, the TEE being hosted by the first party, the channel key being generated through execution of the process to establish remote ownership of the TEE; determining a first split parameter includes generating, by the first party, a first split value based on the first context window and a first regulator key, and generating, by the second party, a second split value based on the first context window and a second regulator key, the first split parameter comprising an aggregation of the first split value and the second split value; the first split value is generated using a pseudo-random function (PRF) of the first key and the second split value is generated using a PRF of the second key; the first regulator key is transmitted to the first party by a verifier system and the second regulator key is transmitted to the second party by the verifier system; the first party determines the first context window and transmits the first context window to the second party, the second party determining a portion of the first split parameter using the first context window; actions further include verifying, by a verifier system, the first watermarked digital content based on a first verification value determined using first key provided from the first party and a second verification value received from the second party; actions further include receiving a second prompt, determining a second split parameter using the first key of the first party and the second key of the second party, providing a second green list of tokens and a second red list of tokens using the second split parameter, determining a second watermark probability distribution that favors tokens in the second green list of tokens over tokens in the second red list of tokens, and returning second watermarked digital content that is generated using the second watermark probability distribution; the first watermark probability distribution is different from the second watermark probability distribution; and actions further include providing a second context window at least partially based on a set of previously received tokens comprising tokens of the first prompt, the second split parameter being determined using the second context window.

The present disclosure also provides a non-transitory computer-readable storage medium coupled to one or more processors and having instructions stored thereon which, when executed by the one or more processors, cause the one or more processors to perform operations in accordance with implementations provided herein.

It is appreciated that the methods and systems in accordance with the present disclosure can include any combination of the aspects and features described herein. That is, methods and systems in accordance with the present disclosure are not limited to the combinations of aspects and features specifically described herein, but also include any combination of the aspects and features provided.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
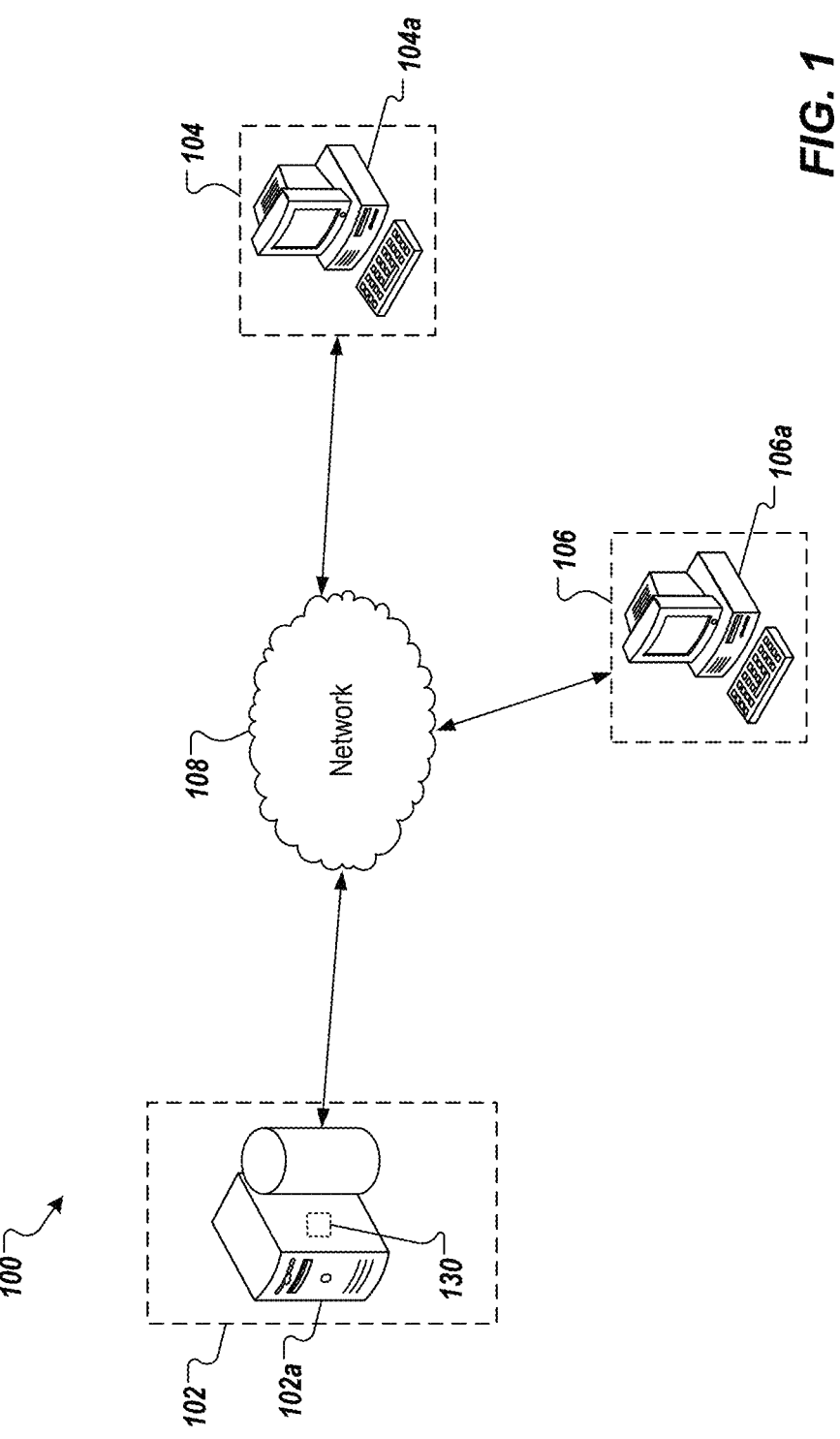
FIG. 1 depicts a high-level architecture in accordance with implementations of the present disclosure.

The technology of this patent application is directed to watermarking of content generated using generative artificial intelligence (GAI). More particularly, implementations of the present disclosure are directed to watermarking GAI-generated digital content using post-quantum, verifiable joint watermarks.

In some implementations, actions include receiving a prompt, providing a context window as a hash value at least partially based on a set of previously received tokens, determining a split parameter using a first key of a first party and a second key of a second party, the first key and the second key generated by a distributed key generation (DKG) process using a channel key, providing a green list of tokens and a red list of tokens using the split parameter, determining a watermark probability distribution that favors tokens in the green list of tokens over tokens in the red list of tokens, and returning watermarked digital content that is generated using the watermark probability distribution.

Implementations of the present disclosure are described in further detail herein with reference to text that is generated using large language models (LLMs), a form of foundation model. It is contemplated, however, that implementations of the present disclosure can be realized with any appropriate content (e.g., text, images, video, audio) generated using any appropriate foundation model.

To provide context for the subject matter of the present disclosure, in GAI, so-called foundation models (e.g., LLMs) are capable of producing content (e.g., text, images) that can be indistinguishable from human-generated content. This raises concerns about malicious content and misattribution of its ownership, authorship, authenticity, and the like. Watermarking is one approach for detecting content generated using AI and has emerged as a front runner in compliance (e.g., compliance with regulatory requirements), for example. Although multiple watermarking solutions have been proposed for this, such solutions do not address settings, in which a provider of a foundation model, which can be referred to as a party A, collaborates with an entity, such as a party B, to train and deploy a custom foundation model that is specific to requirements of party B. In such settings, the watermark should bind both party A and party B to the digital content generated by the custom foundation model.

In view of the foregoing, implementations of the present disclosure provide post-quantum, verifiable watermarks for GAI-generated digital content, each watermark being generated based on a key of party A (foundation model provider), a key of party B (entity, for which a custom foundation model is provided by party A), and keys of a regulator. The custom foundation model embeds the watermark by selecting tokens to include in the digital content based on a watermark distribution that is skewed towards tokens of a green list as opposed to tokens of a red list. The green list and red list are determined based on a split parameter that is determined based on a context window. The context window is provided when the custom foundation model is prompted to generate the digital content. The split parameter is determined based on keys of party A and party B.

As described in further detail herein, the keys of party A and party B are generated using a post-quantum distributed key generation (DKG) process executed between part A and a trusted execution environment (TEE) of party B. In some examples, the TEE of party B is hosted by party A, while party B maintains ownership of the TEE. In some examples, party A determines a first portion of the split parameter based on a context window of the digital content and a first regulator key and party B determines a second portion of the split parameter based on the context window of the digital content and a second regulator key. As described in further detail herein, watermark distribution is determined based on logits of a green list of tokens provided from a vocabulary of the custom foundation model used to generate the digital content.

FIG. 1 depicts an example environment 100 that can be used to execute implementations of the present disclosure. The example environment 100 includes a provider system 102, an entity system 104, a verifier system 106, and a network 108. In some examples, the network 108 includes a local area network (LAN), wide area network (WAN), the Internet, or a combination thereof, and connects web sites, user devices (e.g., computing devices), and back-end systems. In some examples, the network 108 can be accessed over a wired and/or a wireless communications link.

In the depicted example, the provider system 102 includes a computing device 102a, which can, for example, represent one or more servers. In the depicted example, the entity system 104 includes a computing device 104a. In some examples, the computing device 104a can include, without limitation, a server, a desktop computer, a laptop computer, a tablet computing device, and a smartphone. In the depicted example, the verifier system 106 includes a computing device 106a. In some examples, the computing device 106a can include, without limitation, a server, a desktop computer, a laptop computer, a tablet computing device, and a smartphone.

In some examples, the provider system 102 and the computing device 102a are operated by a foundation model provider, referred to herein as party A, that provides custom foundation models (e.g., customized LLMs) for entities. In some examples, the entity system 104 and the computing device 104a are operated by an entity (e.g., person, enterprise, foundation, institution), referred to herein as party B, that uses custom foundation models (e.g., custom LLMs) provided by the provider system 102. In some examples, and as described in further detail herein, a custom foundation model can be provided by fine-tuning a foundation model using training data that is specific to an entity. For example, digital content can be generated for users using a custom foundation model provided by party A, the custom foundation model being specific to party B. In some examples, the verifier system 106 and the computing device 106a are operated by a verifier entity (e.g., governmental entity, regulator) that verifies provenance of digital content generated using GAI. In accordance with implementations of the present disclosure, digital content that is generated for users (using the custom foundation model of party B) is digitally watermarked to evidence a provenance (e.g., ownership, authorship) relative to party A and party B, collectively. As described in further detail herein, the digital watermarks can be verified, for example, by the verifier system 106.

In further detail, and in the example of FIG. 1, the computing device 102a includes a TEE 130. At a high-level, a TEE is a trusted environment within hardware (one or more processors, memory) that is isolated from the hardware's operating environment (e.g., operating system (OS), basic input/output system (BIOS)). In further detail, a TEE is a separate, secure area of a processor that ensures the confidentiality, and integrity of code executing, and data loaded within the main processor. Within a processor, the TEE runs in parallel with the OS. At least portions of so-called trusted applications (TAs) execute within the TEE and have access to the processor and memory of the TEE. Through the TEE, the TAs are protected from other applications running in the main OS. Further, the TEE cryptographically isolates TAs from one another within the TEE. Using TEEs provides multiple benefits in terms of security. For example, the TEE protects cryptographic keys (e.g., a key share of a shared private key) from a wide range of attacks, such as physical attacks and software exploits. An example of a TEE includes Software Guard Extensions (SGX) provided by Intel Corporation of Santa Clara, California, United States. It is contemplated, however, that implementations of the present disclosure can be realized using any appropriate TEE.

In accordance with implementations of the present disclosure, cryptographic keys are used to embed digital watermarks as digital content is GAI-generated to provide watermarked digital content. More particularly, public-key cryptography uses key-pairs that are generated using a cryptographic algorithm (e.g., using cryptographic pseudorandom number generators (CPRNG)), each key-pair including a public key and a private key. Each entity is assigned its own key-pair, where the public key is available to one or more other entities and the private key is held confidential to the respective entity. Further, techniques such as multi-party computation (MPC) and threshold signature schemes (TSS), have been introduced to provide improved security in cryptography. MPC enables multiple entities to evaluate a computation without revealing any private data held by each entity. A TSS enables multiple entities to collectively sign publicly viewable information. That is, a threshold number of entities must participate to sign the information.

A DKG process enables generation of a shared key-pair that can be used for TSS, for example. With a shared key-pair, no single entity knows the private key. Instead, each entity knows the public key (shared public key) and holds an individual secret key share that is a share (portion) of the private key (shared private key). Accordingly, through the DKG process, the shared public key is generated, which can be known to all entities, and multiple shares of a private key, referred to as private key shares, are generated, each private key share only being known to a respective entity of the multiple entities. In some examples, the DKG process can be provided as a post-quantum DKG process, which means that the security of the DKG process holds even if an adversary is using a quantum computer. An example DKG process is provided in *Practical Robust DKG Protocols for CSIDH*, Atapoor et al., which is expressly incorporated herein by reference.

With continued reference to FIG. 1, and as described in further detail herein, the provider system 102 can execute a DKG process to generate private key shares for party A (the provider of the customized foundation models) and party B (the entity of the entity system 104). In accordance with implementations of the present disclosure, the provider system 102 executes the DKG process using the TEE 130. However, while the provider system 102 hosts the TEE 130, the TEE is owned by party B. That is, although the TEE 130 is executed on the computing device 102a of party A, party B controls the root cryptographic material and policy inside the TEE. In some examples, the computing device 102a includes multiple TEEs, each TEE being specific to and owned by a respective entity. For example, while the TEE 130 is specific to party B, another TEE can be provided for and specific to a party C, and still another TEE can be provided for and specific to a party D.

In order to provide remote ownership by party B of the TEE 130 hosted in the computing device 102a of party A, a protocol can be executed between party B (e.g., the computing device 104a) and the TEE 130. For example, party B can send a request for a remote-attestation to the TEE 130. In response to the request, an enclave of the TEE 130 provides an attestation (e.g., a quote, an attestation report, an attestation object) that is based on an ephemeral public key of the enclave. The attestation enables the TEE 130 to attest its identity and code to party B. In some examples, the attestation includes a measurement (MRENCLAVE) that is generated as, for example, a SHA-256 measurement of the initial code and data of the enclave of the TEE 130. Party B receives and validates the attestation. For example, party B validates the signature and collateral of the attestation using an attestation service of the vendor (e.g., Intel) or libraries (e.g., IAS, DCAP, CCA-KFS). If validated, party B extracts the measurement (MRENCLAVE) from the verified payload and compares that hash against a list of enclave measurements provided, for example, in a publicly available allow list. If the measurement is in the allow list, party B can treat the TEE 130 as trusted. If trusted, party B and the enclave of the TEE 130 run a secure handshake to derive a session secret, which culminates in a channel key K that is stored within the TEE 130, party B being recorded as the owner of the channel key K.

Before providing a detailed description of watermarking digital content generated by GAI and verifying watermarks of such digital content, the following preliminaries can be considered. A first definition can be provided, which provides that, for a suitable prime p, $$F: \mathcal{K} \times \mathcal{X} \to \mathbb{Z}_p^m$$

is an efficiently computable pseudo-random function (PRF), such that $(\mathcal{K}, +)$ is a group. It can be said that a tuple $(F, +)$ is a key homomorphic PRF, if, for every $k_1, k_2 \in \mathcal{K}$ and every $x \in \mathcal{X}$, there exists a vector $e \in [0, \gamma]^m$ such that:

$$F(k_1, x) + F(k_2, x) = F(k_1 + k_2, x) + e \pmod{p}$$

A second definition can be provided, where $\mathcal{X} \subset \mathcal{Y}$ with $\ominus$ defining the surjective mapping: $\mathcal{X} \ominus \mathcal{X} \to \mathcal{Y}$. Further, $$F: \mathcal{K} \times \mathcal{X} \to \mathbb{Z}_p^m \text{ and } F': \mathcal{K} \times \mathcal{Y} \to \mathbb{Z}_p^m$$

are two PRF families, where $(\mathcal{K}, +)$ is a group. It can be said that the tuple $(F, \ominus, +)$ is a bi-homomorphic PRF, if one of the following conditions holds:

For every $k_1, k_2 \in \mathcal{K}$ and $x_1, x_2 \in \mathcal{X}$, such that $x_{1,l} = x_{2,l}$ ($=x_l$), there exists a vector $\|e\|_\infty \leq 1$, such that:

$$F(k_1, x_1) + F(k_2, x_2) + e = F'(k_1 + k_2, y) \pmod{p}$$

where $y \in \mathcal{Y}$, such that $y = y_l \| y_r$, with $y_l = x_l$ and $y_r = (x_{1,r} \ominus x_{2,r})$; or For every $k_1$, $k_2 \in \mathcal{K}$ and $x_1$, $x_2 \in \mathcal{X}$, such that $x_{1,r}=x_{2,r}=x_r$, there exists a vector $\|e\|_\infty \leq 1$, such that:

$$F(k_1, x_1) + F(k_2, x_2) + e = F'(k_1 + k_2, y) \text{ (mod } p)$$

where $y \in \mathcal{Y}$, such that $y=y_l\|y_r$, with $y_r=x_r$ and $y_l=(x_{1,l} \ominus x_{2,l})$.

For notation, $k_A$, $k_B \in \mathbb{Z}_q$ are private key shares of part A and party B, respectively, that are derived using a secure post-quantum DKG protocol (such as that discussed above), where $k=k_A+k_B$ mod q, $H:\{0,1\}^* \to \mathcal{H}$ is a cryptographic hash function, and $k_{R,1}$, $k_{R,2} \in \{0,1\}^{|T|-log(|\mathcal{H}|)}$, where T is a full binary tree parameterized by the key-homomorphic and bi-homomorphic PRFs.

With regard to embedding watermarks in digital content generated using GAI, in accordance with implementations of the present disclosure, party A and party B can execute a (post-quantum) DKG process using the channel key K, which results in private key shares $k_A$ and $k_B$ for party A and party B, respectively. The channel key K is known to party A and to party B, and is stored inside the TEE of party B that is hosted by party A. As such, party A, party B, and the TEE can use the channel key K to securely exchange messages. All DKG protocols are interactive and therefore, need added security mechanisms in real world scenarios (e.g., certificates) to ensure that the DKG process is indeed performed among the intended parties. Having a shared secret key, namely the channel key K, can be used to secure channel communications, guaranteeing that only the intended parties are involved in the DKG process.

A verifier, such as a central regulator R (e.g., of the verifier system 106) securely shares regulator keys $k_{R,1}$ and $k_{R,2}$ (generated as random strings) with party A and party B, respectively. In some examples, the central regulator R uses a post-quantum (PQ) key encapsulation mechanism to securely send $k_{R,1}$ and $k_{R,2}$, respectively, to party A and to the TEE of party B (e.g., the TEE 130 that is hosted on the computing device 102a of party A). Here, κ can represent the PQ key.

Figure 2:
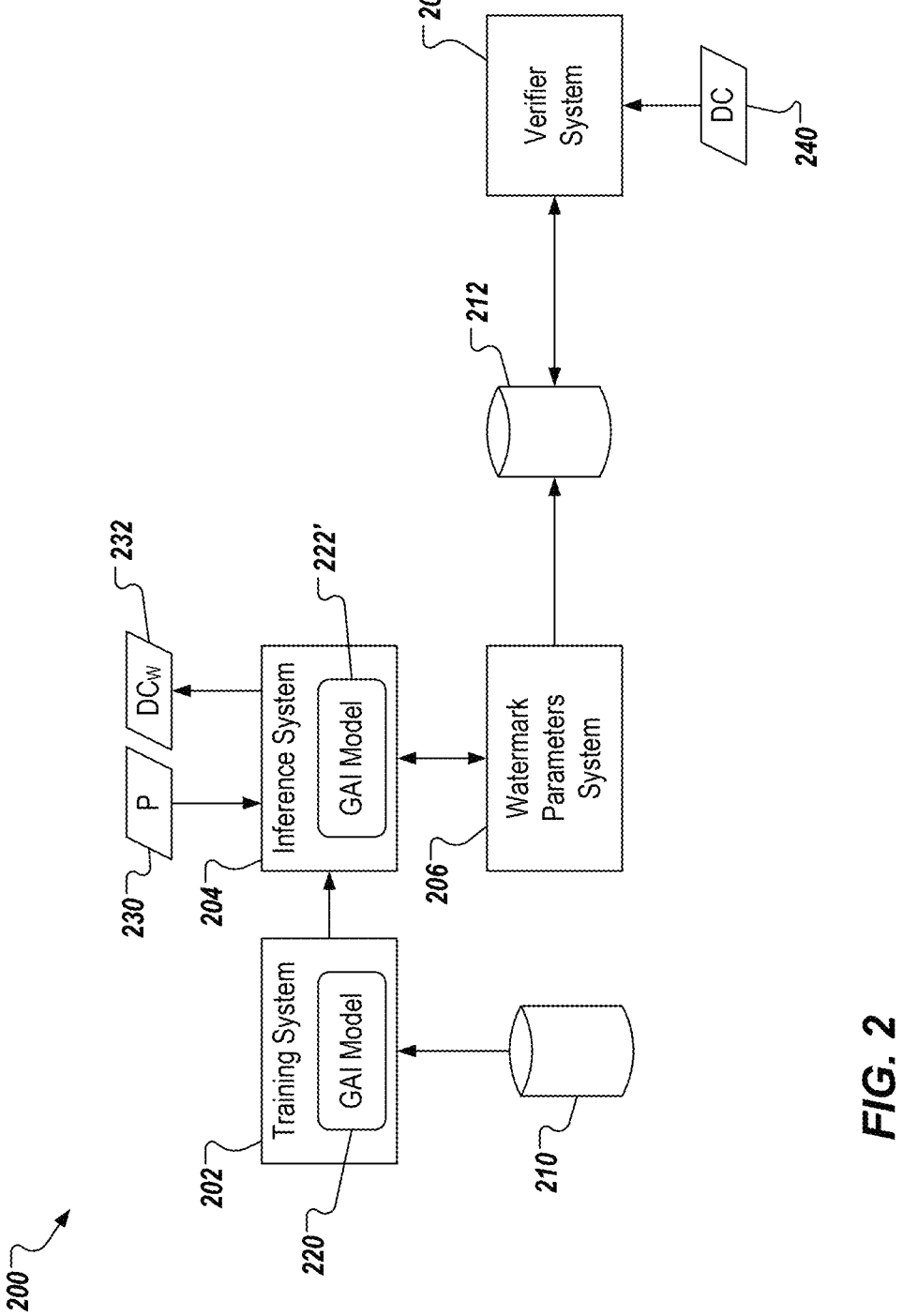
FIG. 2 depicts an example conceptual architecture in accordance with implementations of the present disclosure.

FIG. 2 depicts an example conceptual architecture 200 in accordance with implementations of the present disclosure. The example of FIG. 2 includes a training system 202, an inference system 204, a watermark parameters system 206, a verifier system 208, a training data store 210, and a watermark data store 212. In some implementations, the training system 202, the inference system 204, and the watermark parameters system 206 are each hosted by a party, such as party A referenced herein. For example, each of the training system 202, the inference system 204, and the watermark parameters system 206 is executed by the provider system 102 of FIG. 1.

In accordance with implementations of the present disclosure, the training system 202 can be used to provide party-specific (entity-specific) foundation models, referred to as custom foundation models, that can be deployed to the inference system 204 for inference. For example, the training system 220 can provide a base foundation model 220 and can fine-tune the base foundation model 220 to provide a custom foundation model 222' that is specific to a particular party. In some examples, party-specific training data is provided in the training data store 210 and is used by the training system 202. For example, training data of party B can be used to fine-tune the base foundation model 220 to provide the custom foundation model 222'.

In general, fine-tuning can be performed over multiple iterations (also referred to as epochs) with each iteration adjusting one or more parameters (also referred to as hyper-parameters) of the base foundation model 220 from initialized values provided at a first iteration. For fine-tuning, other parameters of the base foundation model 220 are frozen, such that values are not adjusted during fine-tuning. In some examples, each iteration provides a loss value determined using a loss function. The loss value represents an accuracy of the base foundation model 220 in providing output based on input from the training data. In some examples, when the loss is determined to be sufficiently low (e.g., zero, below a threshold value) fine-tuning of the base foundation model 220 can be determined to be complete. In some examples, a pre-determined number of iterations is executed.

For purposes of illustration, and by way of non-limiting example, party B can be an enterprise that would like to deploy a LLM-based digital assistant. For this, the base foundation model 220 can be a base LLM that is provided by party A and is trained on general, domain-agnostic, entity-agnostic training data. The base foundation model 220 is fine-tuned using training data that is specific to party B to provide the custom foundation model 222' that is specific to one or more domains of party B and/or one or more products and/or services provided by party B. The custom foundation model 222' can be deployed to the inference system 204 to operate with a front-end system of party B.

In further detail, the inference system 204 can receive a prompt 230 that is to be processed by the custom foundation model 222'. For example, party B can provide a front-end system (e.g., a digital assistant user interface (UI)), through which users can submit prompts, such as the prompt 230 (e.g., as part of a natural language conversation with the digital assistant). The prompt 230 is processed by the custom foundation model 222', which generates watermarked digital content 232 (e.g., text) that is responsive to the prompt 230.

In some implementations, the watermark parameters system 206 generates watermark parameters that are used to embed a digital watermark to provide the watermarked digital content 232 that is returned (e.g., to the digital assistant UI). As described herein, the watermark is provided as tokens from a green list that are selected by the custom foundation model 222' in response to the prompt 230. Watermarking in accordance with implementations of the present disclosure, as described in further detail herein, results in watermark parameters that are specific to a context window at the time that the prompt 230 is received, as well as being specific to party A and party B. The watermark parameters are stored in the watermark data store 212 (e.g., uniquely indexed to the watermarked digital content 232).

In some implementations, the verifier system 208 can verify aspects (e.g., authenticity, ownership, authorship) of digital content by detecting and verifying watermarks within the digital content. In some examples, the verifier system 208 is operated by an entity and/or person that seeks to verify aspects of digital content (e.g., a regulator). For example, the verifier system 208 can receive digital content 240 that is purported to be from the custom foundation model 222' of party B (e.g., hosted by party A). Hence, the verifier system 106 is tasked with verifying that the digital content 240 includes a watermark that is embedded by the custom foundation model 222' of party B, as described herein.

As described in further detail herein, watermarking in accordance with implementations of the present disclosure build on traditional approaches to watermarking GAI-generated digital content. For context, a high-level summary of traditional approaches is provided. An example traditional approach is discussed in *A Watermark for Large Language Models*, Kirchenbauer et al., Proceedings of the 40th International Conference on Machine Learning. Vol. 202. Proceedings of Machine Learning Research. PMLR, 2023, pp. 17061-17084, which is expressly incorporated herein by reference in the entirety for all purposes.

In further detail, t can denote an index for a context window $C_t$ (provided as a hash value) when a prompt is received, where watermarked digital content is to be generated in response to the prompt. Here, a context window can refer to the amount of information that is held for reference for subsequent inference using a foundation model. For example, the context window can be defined in terms of a number of tokens (e.g., words, sub-words, characters) that a foundation model can reference in generating digital content. In some examples, the context window includes tokens of prompts (and, in some instances, responses to prompts) that the foundation model can use as reference for subsequent generation of digital content. In some examples, the context window $C_t$ is provided as a hash value that is determined by hashing the string of tokens in the context window.

Continuing, V represents the vocabulary of the foundation model provided as words or word fragments, referred to as tokens. For watermarking, tokens can be divided between a green list and a red list, where tokens in the green list carry a watermark bit, or otherwise correspond to a desired signal), and the red list is the complementary set, whose use weakens or erases the desired signal. Further, $\gamma \in (0,1)$ is the fraction of vocabulary put in the green list at each step (a typical range being [0.25-0.5]), $\delta > 0$ is a logit bias added to respective logits of each token in the green list (a typical range being [0.5-2.0]), and $\alpha = e^{\delta}$ is a convenience factor.

A next-token bias can be computed based on the context window $C_t$, which can be determined as:

$$C_t \leftarrow H(\zeta, s_{\rho t+1}, \ldots, s_{2\rho t})$$

where $\rho$ is the size of the context window, $s_i$ are published tokens. Different protocols can have private or public $\zeta$ with pre-defined entropy conditions. In general, $\zeta$ is a parameter that ensures that the output of the PRF is sufficiently unpredictable and independent across different sessions/contexts, even if the base context window repeats. This prevents potential structure leakage from deterministic evaluation (because hash functions are deterministic) of the group action.

Continuing, a split parameter $\mu_t$ can be determined as:

$$\mu_t \leftarrow PRNG(C_t)$$

where PRNG is a pseudo-random number generator. Further, a dynamic, context-specific green list is generated as $G_t =$ first $\lceil \gamma |V| \rceil$ indices from the output of permutation $\mu_t$-shuffle(V). As such, the red list can be generated as $R_t = V \backslash G_t$. Further, for $j \in G_t$, a logit can be provided as:

$$l_t[j] \leftarrow l_t[j]\delta$$

where $\delta$ is a bias value. A logit can be described as a raw (pre-softmax) score that the foundation model assigns to each token in V, given the current context $C_t$ (i.e., the context when the prompt is received, the watermarked digital content to be generated in response to the prompt). Accordingly, the logits of the tokens in the green list are biased, such that tokens in the green list are more likely to be selected in generating digital content responsive to the prompt.

After biasing the logits, a softmax function is used to provide a (watermark) probability distribution $\hat{p}_t$ as:

$$\hat{p}_t = SoftMax(l_t); s_{2\rho t+1} = \hat{p}_t$$

Accordingly, this can be referred to as the watermarked distribution, which can be described as the probability law from which the next token will be sampled when embedding the watermark in the digital content. Compared with the original (base) distribution of the foundation model, the watermarked distribution is (slightly) skewed toward tokens in the green list (i.e., tokens that encode the watermark bit). In this manner, the quality of the digital content (text) is preserved.

It can be seen that embedding of the bias is stateless and requires $O(|V|)$ steps. Knowledge of the split parameter $\mu_t$ can be used by a verifier to reconstruct $G_t$ for the given text and apply one-sided binomial test to confirm that the text was generated by a foundation model, because it will have more than expected tokens from $G_t$. That is, a verifier can test generated text to determine whether its token frequencies match what is expected, if sampling had come from the watermarked distribution.

In view of the above context of traditional approaches, watermarking in accordance with implementations of the present disclosure are described in further detail. More particularly, and as discussed above, party A and party B perform DKG between party A and the TEE of party B that is hosted by party A (e.g., the TEE 130 of FIG. 1). The DKG is executed using the channel key K determined during party B obtaining remote ownership of the TEE. The DKG results in private key shares $k_A$ and $k_B$ for party A and party B, respectively. While the private key share $k_B$ is generated by the TEE hosted by party A, $k_B$ cannot be accessed by party A. The verifier, such as a central regulator R (e.g., of the verifier system 106) securely shares regulator keys $k_{R,1}$ and $k_{R,2}$ with party A and party B, respectively. As described herein, the central regulator R uses a PQ key encapsulation mechanism to securely send $k_{R,1}$ and $k_{R,2}$, respectively, to party A and to the TEE of party B (e.g., the TEE 130 that is hosted on the computing device 102$a$ of party A). Here, $\kappa$ can represent the PQ key.

In accordance with implementations of the present disclosure, a prompt is received for processing by the custom foundation model and a context window $C_t$ is determined. For the context window $C_t$, party A computes $C_t = H(s_{\rho t+1}, \ldots, s_{2\rho t})$ and $A_t = F_{k_A}(C_t \| k_{R,1})$. The TEE, of party B, hosted by party A, receives $C_t$ from party A and computes $B_t = F_{k_B}(C_t \| k_{R,2})$. Party A computes the split parameter $\mu_t$ as $\mu_t = A_t + B_t = F'_{k_A + k_B}(C_t \| k_{R,1} \ominus k_{R,2})$. The context-specific green list is generated as $G_t =$ first $\lceil \gamma |V| \rceil$ indices from the output of permutation $\mu_t$-shuffle(V) and the red list can be generated as $R_t = V \backslash G_t$. Further, for $j \in G_t$, a logit can be provided as:

$$l_t[j] \leftarrow l_t[j] + \delta$$

After biasing the logits, a softmax function is used to provide a (watermark) probability distribution $\hat{p}_t$ as:

$$\hat{p}_t = SoftMax(l_t); s_{2\rho t+1} = \hat{p}_t$$

In generating the watermarked digital content, the custom foundation model selects next tokens based on the watermarked distribution, which is (slightly) biased towards tokens in the green list. In this manner, tokens in the green list (which carry the watermark bit) are more frequently selected as a next token. As a result, the watermarked digital content includes more tokens from the green list than tokens from the red list. Accordingly, implementations of the present disclosure provide a watermark is embedded as a hidden pattern in the digital content. That is, the pattern is hidden in the sense that it is imperceptible to humans, but is algorithmically identifiable through verification, as described herein.

With regard to verifying watermarks of digital content generated using GAI, to verify a given text, regulator R (or its assigned delegates with secret shares of $k_{R,1}$, $k_{R,2}$) requests that party A provide its private key share ky and selects a set of random indices as $\{t\}_{i \in [l]}$. Regulator R computes $R_{t_i} = F_{k_A}(C_{t_i} \| k_{R,1})$ for all $i \in [l]$. The value of l can be chosen according to $\gamma$ and $\alpha$ as it must be enough to convince regulator R of accuracy.

Regulator R uses its key $k_{R,2}$ to create a secure communication tunnel with the TEE of party B. Because the key $k_{R,2}$ is known to regulator R and to the TEE of party B, the key $k_{R,2}$ can be used to create a secure communication channel by using the key $k_{R,2}$ to encrypt and generate HMAC of their messages. This enables authenticated encryption to ensure that no one can impersonate regulator R.

Continuing, regulator R sends $\{C_{t_i}, t_i\}_{i \in [l]}$ to the TEE. Because $C_t$ is only a hash output, the size of l can be chosen as relatively high as needed, because hash function shrinks any length input into a shorter representative context window $C_t$. The TEE of party B returns $B_{t_i} = F_{k_B}(C_{t_i} \| k_{R,2})$ and regulator R computes $\mu_{t_i} = R_{t_i} + B_{t_i}$ and proceeds to reconstruct $G_{t_i}$. Regulator R can verify the watermark by counting the number of tokens from $G_t$ and checking whether their proportion exceeds a pre-defined threshold.

To detect watermarks, a statistical model is provided. Here, n denotes the number of tokens tested, and the following relationship can be provided:

$$S = \sum_{t=1}^{n} 1\{s_t \in G_t\}$$

which represents the number of published tokens $s_t$ that fall in the green list $G_t$. A null hypothesis (unwatermarked) is provided, under which the output of the LLM is unwatermarked and the green list $G_t$ is pseudorandom with respect to the sequence, such that:

$$S \sim \text{Binomial}(n, \gamma)$$

where $\gamma \in (0,1)$ is the fraction of vocabulary V placed on the green list at each step.

When watermarked, logits of green tokens are shifted by $\delta > 0$, producing an effective probability represented as:

$$p_g \approx \frac{e^\delta \gamma}{e^\delta \gamma + (1 - \gamma)}$$

For $\gamma = 0.5$, this reduces to:

$$p_g = \frac{e^\delta}{e^\delta + 1} = \sigma(\delta)$$

A normalized detection statistic can be provided as:

$$Z = \frac{S - n\gamma}{\sqrt{n\gamma(1 - \gamma)}}.$$

Under the null hypothesis:

$$Z \approx \mathcal{N}(0,1)$$

Here, $\mathcal{N}(\mu, \sigma^2)$ denotes a normal distribution (bell curve) with mean $\mu$ and variance $\sigma^2$. Thus, $\mathcal{N}(0,1)$ is the standard normal distribution, centered at 0 with spread 1.

A threshold $\tau = \Phi^{-1}(1-\alpha)$ is selected for a target false-positive rate $\alpha$. For example, $\tau \approx 2.33$ for $\alpha = 0.01$, and $\tau \approx 3.09$ for $\alpha = 10^{-3}$. Under presence of a watermark:

$$Z \sim \mathcal{N}(\mu_Z, 1), \ \mu_Z = \frac{(p_g - \gamma)n}{\sqrt{n\gamma(1 - \gamma)}}$$

For $\gamma = 0.5$, this simplifies to:

$$\mu_Z = 2(p_g - 0.5)\sqrt{n}$$

In terms of detection power, the detection power at threshold $\tau$ is provided as:

$$\Pr[\text{detect}] = 1 - \Phi(\tau - \mu_Z)$$

This expression shows the explicit dependence on ($\gamma$, $\delta$, n), and quantifies how long a sequence is required for a regulator R to confidently distinguish watermarked output from unwatermarked output.

Figure 3:
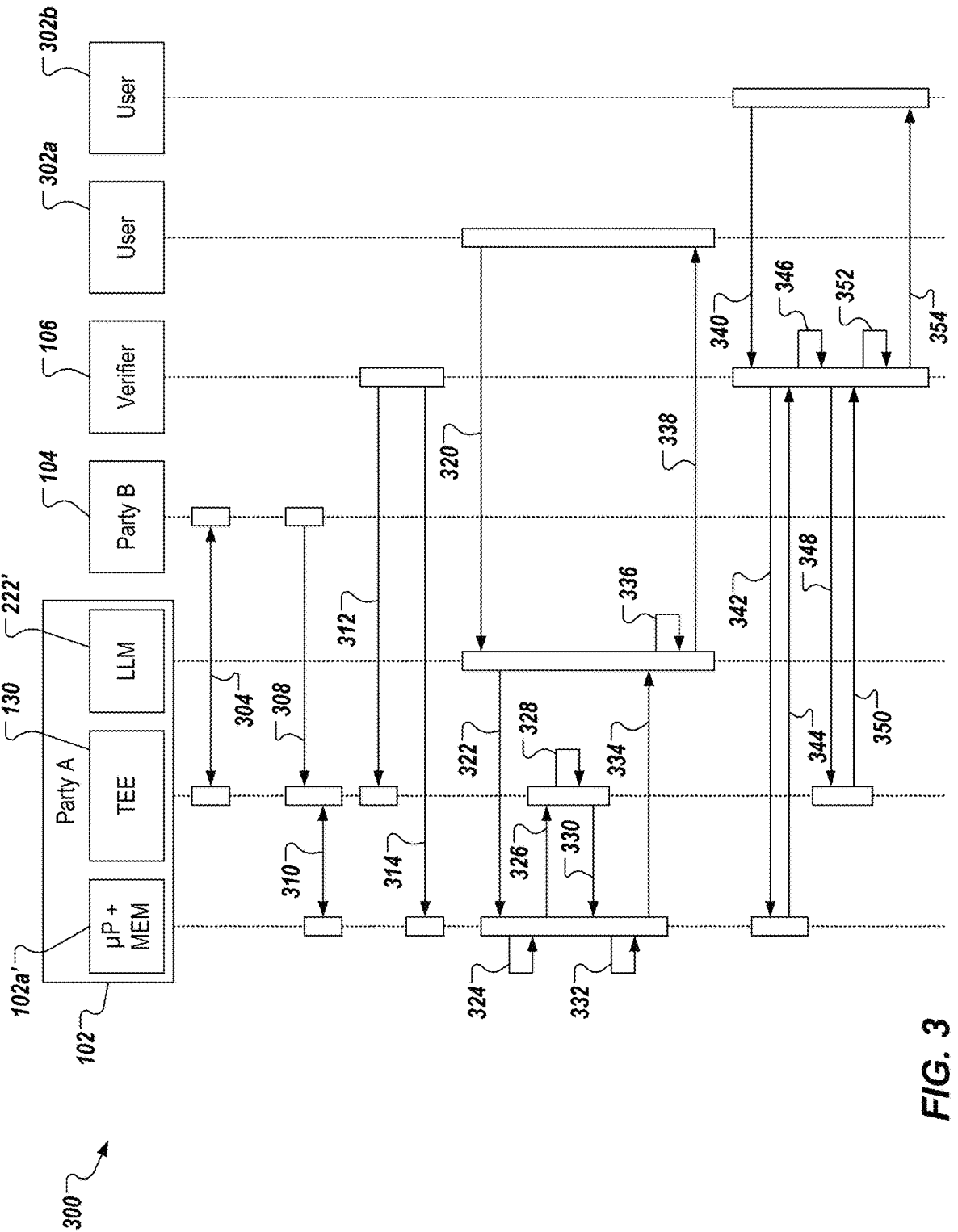
FIG. 3 depicts an example signal flow diagram in accordance with implementations of the present disclosure.

FIG. 3 depicts an example signal flow diagram 300 in accordance with implementations of the present disclosure. The example of FIG. 3 includes the provider system 102 of party A, the entity system 104 of party B, the verifier system 106, a user system 302a, and a user system 302b.

In some implementations, the entity system 104 executes (304) a remote ownership protocol with the TEE 130, which results in a channel key K that is stored within the TEE 130, party B being recorded as the owner of the channel key K, as described in detail herein. In some examples, party B initiates (308) execution (308) of a DKG protocol 310 between the TEE 130 and a system 102a' of party A, which results in private key shares $k_A$ and $k_B$ for party A and party B, respectively. While the private key share $k_B$ is generated by and stored in the TEE 130 hosted by party A, $k_B$ is not known to and cannot be accessed by party A.

In some implementations, the verifier system 106 (e.g., a regulator R) securely shares verifier keys $k_{R,1}$ and $k_{R,2}$ (e.g., each provided as a random string) with party A and party B, respectively, as described herein. For example, the verifier system 106 uses a PQ key encapsulation mechanism to securely send (312, 314) $k_{R,1}$ and $k_{R,2}$, respectively, to party A and to the TEE 130 of party B. For example, the provider system 102 and/or the entity system 104 can send a request to the verifier system 106 to request the verifier keys $k_{R,1}$ and $k_{R,2}$ from the verifier system 106.

In some implementations, the user system 302a can interact (320) with the custom foundation model 222′ that is hosted by the provider system 102. For example, a user can interact with a digital assistant UI provided by the user system 302a to submit a prompt (e.g., the prompt 230 of FIG. 2) to the custom foundation model 222′ to trigger generation of watermarked digital content (e.g., the watermarked digital content 232 of FIG. 2).

For example, in response to the prompt 230, the custom foundation model 222′ (e.g., the inference system 204) provides (322) the context (e.g., the prompt and tokens of previously received prompts) to the system 102a′ (e.g., providing at least a portion of the watermark parameters system 206 of FIG. 2). The system 102a′ computes (324) $C_t = H(s_{\rho t+1}, \ldots, s_{2\rho t})$ and $A_t = F_{k_A}(C_t \| k_{R,1})$ and sends (326) $C_t$ to the TEE 130, which computes (328) $B_t = F_{k_B}(C_t \| k_{R,2})$ and sends (330) $B_t$ to the system 102a′. The system 102a′ executes (332) functionality to determine watermark parameters (e.g., $\mu_t$, $G_t$, $R_t$, $\hat{p}_t$) and can return (334) at least a portion of the watermark parameters (e.g., $\hat{p}_t$) to the custom foundation model 222′, which generates (336) the watermarked digital content based on the at least a portion of the watermark parameters. That is, the custom foundation model 222′ selects tokens based on the watermarked distribution, which is (slightly) skewed toward tokens in the green list. The custom foundation model 222′ returns (338) the watermarked digital content to the user system 302a.

In some examples, and as described herein, the user system 302a can interact with the custom foundation model 222′ to generate watermarked digital content (e.g., the watermarked digital content 232′ of FIG. 2) that can be used for one or more purposes. For example, a user associated with the user system 302a can publish digital content (e.g., the digital content 240 of FIG. 2), which can be relied on by one or more third-parties, such as a user associated with the user system 302b. The user associated with the user system 302b can look to rely on the digital content, if a provenance of the digital content can be verified.

In view of this, the user system 302b sends (340) a request to the verifier system 106 to request that the verifier system 106 verify provenance of digital content. In some examples, the request includes the digital content and an identifier that uniquely identifies a source of the digital content. For example, the identifier uniquely identifies party A and/or party B (e.g., an identifier that uniquely identifies the foundation model used to generate the digital content). In some examples, in response to the request, the user system 302b, the verifier system 106 sends (342) a request to party A to request the private key share $k_A$ and the party A sends (344) a response with the private key share $k_A$ (e.g., in response to party A authenticating the request form the verifier system 106).

The verifier system 106 executes (346) functionality to select a set of random indices as $\{t\}_{i \in [l]}$ and compute $R_{t_i} = F_{k_A}(C_{t_i} \| k_{R,1})$ for all $i \in [l]$, as described herein. The verifier system 106 sends (348) $\{C_{t_i}, t_i\}_{i \in [l]}$ to the TEE 130. For example, and as described herein, the verifier system 106 uses its key $k_{R,2}$ to create a secure communication tunnel with the TEE 130 and send $\{C_{t_i}, t_i\}_{i \in [l]}$. The TEE 130 determines and returns (350) $B_{t_i} = F_{k_B}(C_{t_i} \| k_{R,2})$ (for all $i \in [l]$) to the verifier system 106. The verifier system 106 executes (352) functionality to compute $\mu_{t_i} = R_{t_i} + B_{t_i}$ and reconstruct $G_{t_i}$. The verifier system 106 can verify the watermark by counting the number of tokens from $G_t$ and checking whether their proportion exceeds a pre-defined threshold. The verifier system 106 returns (354) a response to the user system 302b, which indicates whether the digital content is verified (e.g., the provenance of the digital content is verified).

Figure 4:
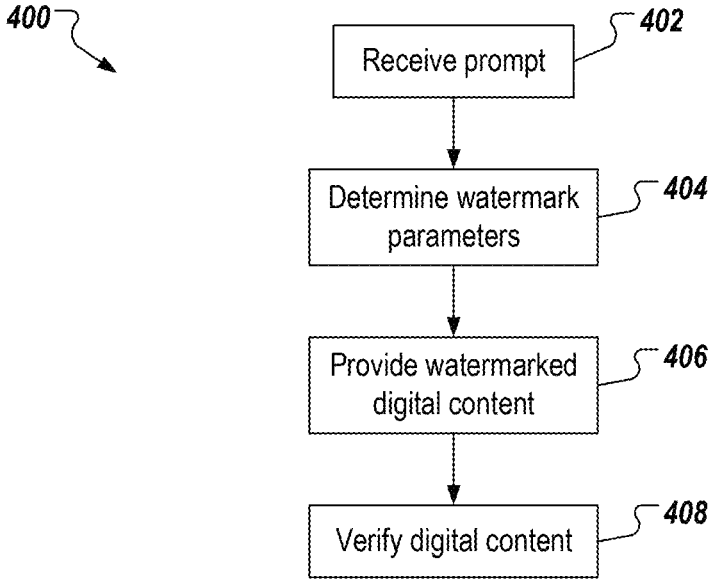
FIG. 4 depicts a flowchart of an example process that can be executed in accordance with implementations of the present disclosure.

FIG. 4 depicts a flowchart of an example process 400 that can be executed in accordance with implementations of the present disclosure. In some examples, the example process 400 is provided using one or more computer-executable programs executed by one or more computing devices. In some examples, the example process 400 is executed after party B has established remote ownership of a TEE that is host by party A, and party A, the TEE of party B have executed a DKG protocol to provide private key shares $k_A$ and $k_B$, and the regulator R has provided verifier keys $k_{R,1}$ and $k_{R,2}$ (e.g., each provided as a random string) with party A and party B, respectively.

A prompt is received (402). For example, and as described in detail herein with reference to FIGS. 2 and 3, the inference system 204 receives the prompt 230. Watermark parameters are determined (404). For example, and as described in detail herein, a split parameter $\mu_t$ is determined based on a context window $C_t$, and private key shares $k_A$ and $k_B$ of part A and party B, respectively. As also described herein, the private key shares $k_A$ and $k_B$ are generated through a post-quantum DKG process using a channel K that is provided through party B establishing remote ownership of the TEE 130 that is hosted by party A. A green list $G_t$ and a red list $R_t$ are determined using the split parameter $\mu_t$, and a watermark distribution pt is provided that skews toward tokens in the green list $G_t$. Watermarked digital content is generated (406). For example, and as described in detail herein, at least a portion of the watermark parameters (e.g., $\hat{p}_t$) to the custom foundation model 222′, which generates the watermarked digital content 232 based on the at least a portion of the watermark parameters. For example, the custom foundation model 222′ selects tokens based on the watermarked distribution $\hat{p}_t$, which is (slightly) skewed toward tokens in the green list. The custom foundation model 222′ returns the watermarked digital content 232.

Digital content is verified (408). For example, and as described in detail herein, the verifier system 106 sends a request to party A to request the private key share $k_A$ and the party A sends a response with the private key share $k_A$ (e.g., in response to party A authenticating the request form the verifier system 106). The verifier system 106 selects a set of random indices as $\{t\}_{i \in [l]}$ and computes $R_{t_i} = F_{k_A}(C_{t_i} \| k_{R,1})$ for all $i \in [l]$, as described herein. The verifier system 106 sends $\{C_{t_i}, t_i\}_{i \in [e]}$ to the TEE 130. For example, and as described herein, the verifier system 106 uses its key $k_{R,2}$ to create a secure communication tunnel with the TEE 130 and send $\{C_{t_i}, t_i\}_{i \in [l]}$. The TEE 130 determines and returns $B_{t_i} = F_{k_B}(C_{t_i} \| k_{R,2})$ (for all $i \in [l]$) to the verifier system 106. The verifier system 106 computes $\mu_{t_i} = R_{t_i} + B_{t_i}$ and reconstructs $G_{t_i}$. The verifier system 106 can verify the watermark by counting the number of tokens from $G_t$ and checking whether their proportion exceeds a pre-defined threshold.

This specification uses the term "configured" in connection with systems and computer program components. For a system of one or more computers to be configured to perform particular operations or actions means that the system has installed thereon software, firmware, hardware, or a combination thereof that, in operation, cause the system to perform the operations or actions. For one or more computer programs to be configured to perform particular operations or actions means that the one or more programs include instructions that, when executed by data processing apparatus, cause the apparatus to perform the operations or actions.

Implementations of the subject matter and the functional operations described in this specification can be realized in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs (i.e., one or more modules of computer program instructions) encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. The program instructions can be encoded on an artificially-generated propagated signal (e.g., a machine-generated electrical, optical, or electromagnetic signal) that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry (e.g., an FPGA (field programmable gate array) or an ASIC (application-specific integrated circuit)). The apparatus can optionally include, in addition to hardware, code that creates an execution environment for computer programs (e.g., code) that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data (e.g., one or more scripts stored in a markup language document) in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry (e.g., a FPGA, an ASIC), or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random-access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer can be embedded in another device (e.g., a mobile telephone, a personal digital assistant (PDA), a mobile audio or video player, a game console, a Global Positioning System (GPS) receiver), or a portable storage device (e.g., a universal serial bus (USB) flash drive) to name just a few.

Computer-readable media suitable for storing computer program instructions and data include all forms of non-volatile memory, media and memory devices, including by way of example semiconductor memory devices (e.g., EPROM, EEPROM, and flash memory devices), magnetic disks (e.g., internal hard disks or removable disks), magneto-optical disks, and CD-ROM and DVD-ROM disks.

To provide for interaction with a user, implementations of the subject matter described in this specification can be provisioned on a computer having a display device (e.g., a CRT (cathode ray tube) or LCD (liquid crystal display) monitor) for displaying information to the user and a keyboard and a pointing device (e.g., a mouse, a trackball), by which the user can provide input to the computer. Other kinds of devices can be used to provide for interaction with a user as well; for example, feedback provided to the user can be any form of sensory feedback (e.g., visual feedback, auditory feedback, tactile feedback); and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device (e.g., a smartphone that is running a messaging application), and receiving responsive messages from the user in return.

Implementations of the subject matter described in this specification can be realized in a computing system that includes a back-end component (e.g., as a data server) a middleware component (e.g., an application server), and/or a front-end component (e.g., a client computer having a graphical user interface, a web browser, or an app through which a user can interact with implementations of the subject matter described in this specification, or any combination of one or more such back-end, middleware, or front-end components. The components of the system can be interconnected by any form or medium of digital data communication (e.g., a communication network). Examples of communication networks include a local area network (LAN) and a wide area network (WAN) (e.g., the Internet).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a user device (e.g., for purposes of displaying data to and receiving user input from a user interacting with the device), which acts as a client. Data generated at the user device (e.g., a result of the user interaction) can be received at the server from the device.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially be claimed as such, one or more features from a claimed combination can in some cases be excised from the combination, and the claimed combination may be directed to a sub-combination or variation of a sub-combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for generating watermarked digital content using generative artificial intelligence (GAI), the method comprising:

receiving a first prompt;

providing a first context window as a hash value by processing a set of previously received tokens through a hash function;

determining a first split parameter using a first key of a first party and a second key of a second party, the first key and the second key generated by a distributed key generation (DKG) process using a channel key, the first split parameter being used to assign tokens to one of a green list and a red list;

providing a first green list of tokens and a first red list of tokens using the first split parameter;

determining a first watermark probability distribution that is biased towards tokens in the first green list of tokens over tokens in the first red list of tokens, such that more tokens are selected from the green list of tokens than are selected from the red list of tokens in generating a watermark; and returning first watermarked digital content that is generated using the first watermark probability distribution.

2. The computer-implemented method of claim 1, further comprising executing a process to establish remote ownership of a trusted execution environment (TEE) by the second party, the TEE being hosted by the first party, the channel key being generated through execution of the process to establish remote ownership of the TEE.

3. The computer-implemented method of claim 1, wherein determining a first split parameter comprises:

generating, by the first party, a first split value based on the first context window and a first regulator key; and generating, by the second party, a second split value based on the first context window and a second regulator key, the first split parameter comprising an aggregation of the first split value and the second split value.

4. The computer-implemented method of claim 3, wherein the first split value is generated using a pseudorandom function (PRF) of the first key and the second split value is generated using a PRF of the second key.

5. The computer-implemented method of claim 3, wherein the first regulator key is transmitted to the first party by a verifier system and the second regulator key is transmitted to the second party by the verifier system.

6. The computer-implemented method of claim 1, wherein the first party determines the first context window and transmits the first context window to the second party, the second party determining a portion of the first split parameter using the first context window.

7. The computer-implemented method of claim 1, further comprising verifying, by a verifier system, the first watermarked digital content based on a first verification value determined using first key provided from the first party and a second verification value received from the second party.

8. The computer-implemented method of claim 1, further comprising:

receiving a second prompt;

determining a second split parameter using the first key of the first party and the second key of the second party;

providing a second green list of tokens and a second red list of tokens using the second split parameter;

determining a second watermark probability distribution that favors tokens in the second green list of tokens over tokens in the second red list of tokens; and returning second watermarked digital content that is generated using the second watermark probability distribution.

9. The computer-implemented method of claim 8, wherein the first watermark probability distribution is different from the second watermark probability distribution.

10. The computer-implemented method of claim 8, further comprising providing a second context window at least partially based on a set of previously received tokens comprising tokens of the first prompt, the second split parameter being determined using the second context window.

* * * * *